Oct. 13, 1959 J. O. STEPHENSON ET AL 2,908,492
UNIVERSAL ADAPTER
Filed April 30, 1956 3 Sheets-Sheet 1
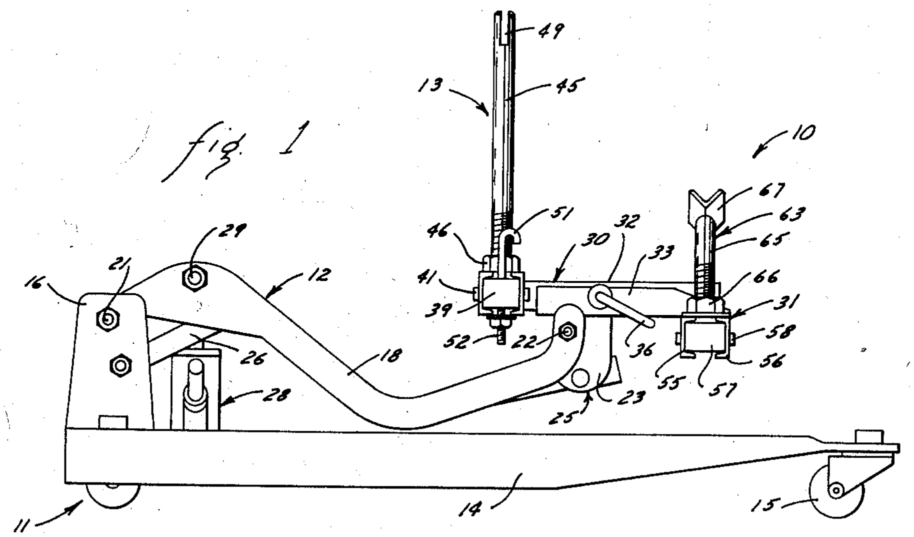
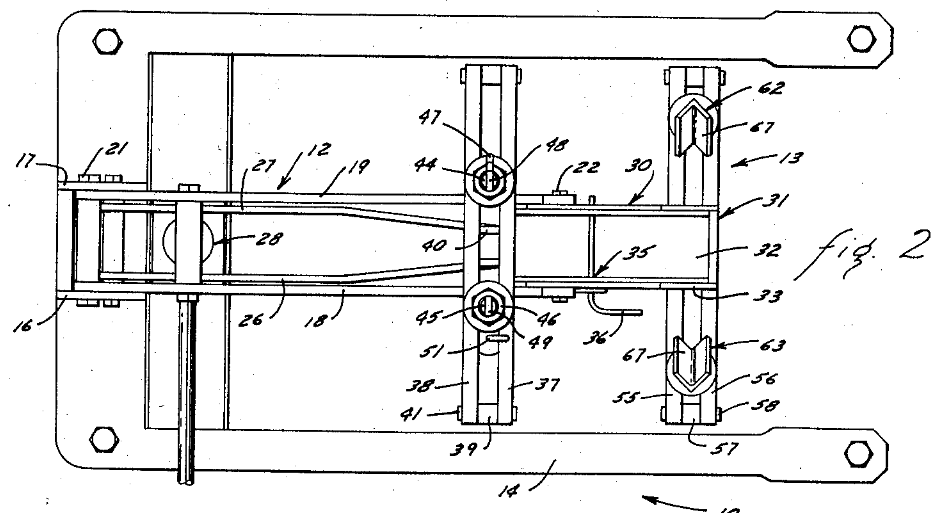
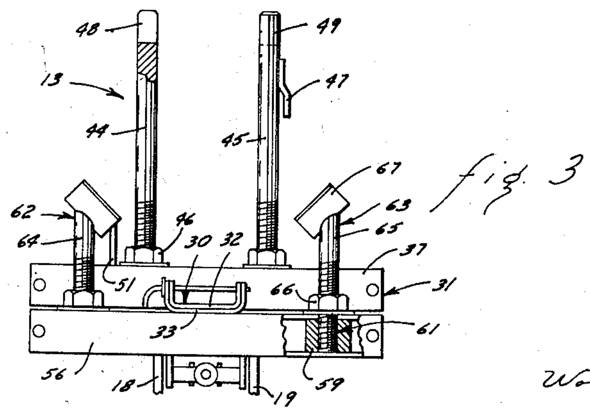
INVENTORS
JOHN O. STEPHENSON
JOHN H. HILLIS
BY
Woodhams Blanchard & Flynn
ATTORNEYS Oct. 13, 1959 J. O. STEPHENSON ET AL 2,908,492
UNIVERSAL ADAPTER
Filed April 30, 1956 3 Sheets-Sheet 2
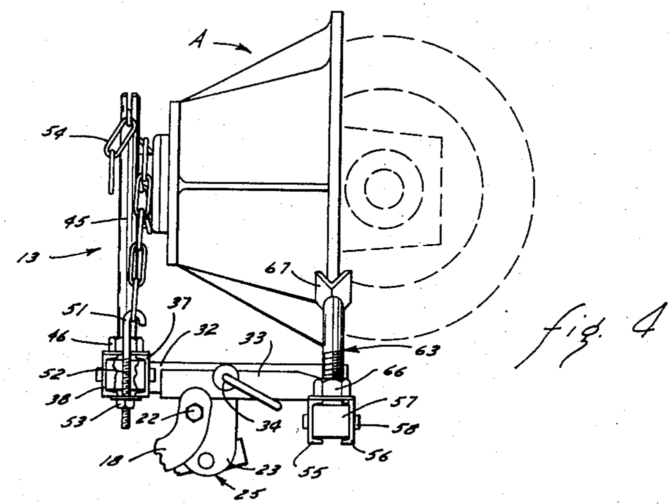
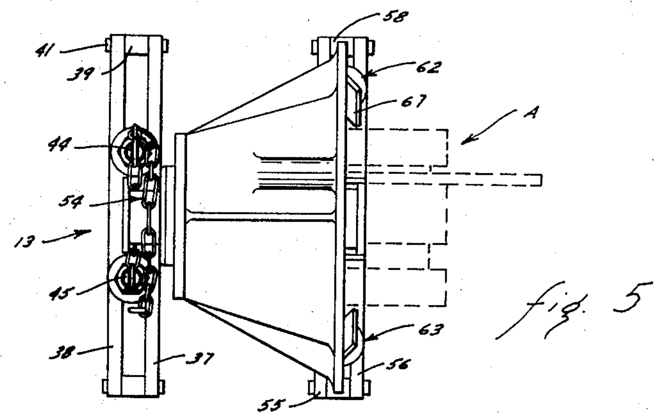
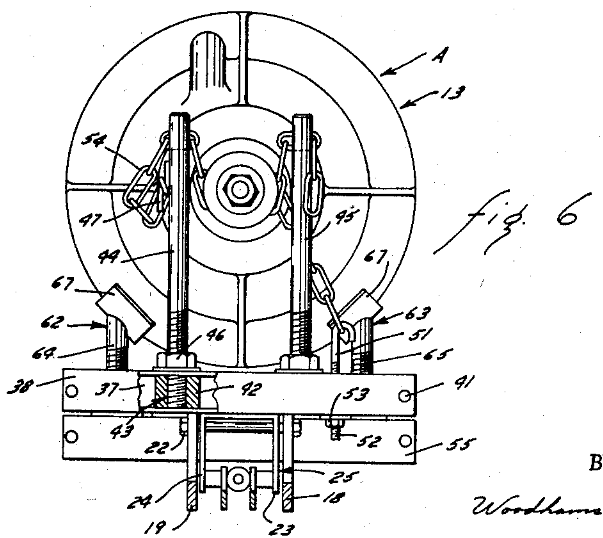
INVENTORS
JOHN O. STEPHENSON
JOHN H. HILLIS
BY
Woodhams Blanchard & Flynn
ATTORNEYS

UNIVERSAL ADAPTER

INVENTORS
JOHN O. STEPHENSON
JOHN H. HILLIS
BY
Woodhams Blanchard and Flynn
ATTORNEYS United States Patent Office 2,908,492 Patented Oct. 13, 1959

2,908,492

UNIVERSAL ADAPTER

John O. Stephenson, Grosse Isle, and John H. Hillis, Highland Park, Mich.; said Hillis assignor to said Stephenson Application April 30, 1956, Serial No. 582,060

4 Claims. (Cl. 269—127)

This invention relates to an adapter cooperable with a lift-type jack for engaging various types of work pieces, whereby said work pieces, which may be of a wide variety of irregular shapes and sizes, are firmly secured to said jack for movement thereby.

It is common practice in garage and service station operations to place a castered, lift-jack beneath an automobile for engaging and removing automotive components, such as transmissions or differentials. However, because of the irregular and non-uniform sizes and shapes of these various units for different types and models of automobiles, it is frequently and presently necessary for a garage to possess many different types of adapters in order to accommodate the different kinds of said units which are normally encountered. Thus, the need has become apparent for an adapter capable of use with an ordinary lift-type of jack, and securely engageable with a wide variety of shapes and sizes of such automotive components. Further, since it is conceivable that the device may be used with many types of units other than automotive parts, such as farm equipment, and particularly tractors, the universality and flexibility of the adapter becomes extremely important.

Accordingly, a major object of this invention is to provide an adapter readily connectible to, and operable with, a lift-type jack for engaging automotive components having a wide variety of irregular sizes and shapes, such as transmissions or differentials.

A further object of this invention is to provide an adapter, as aforesaid, which is sufficiently simple in its operation that it can be handled easily and quickly by any ordinary mechanic capable of handling a lift-type jack.

A further object of this invention is to provide an adapter, as aforesaid, which is relatively simple in construction, and thereby inexpensive to manufacture.

A further object of this invention is to provide an adapter, as aforesaid, which is sufficiently simple and sturdy in its construction that it will require relatively little maintenance, even though it is subjected to rugged usage.

A further object of this invention is to provide an adapter, as aforesaid, which will have a high degree of flexibility in its application.

Other objects and purposes of this invention will become apparent to persons acquainted with apparatus of this general type upon reading the following specification and examining the accompanying drawings, in which:

Figure 1 is a side elevation view of a lift mechanism, including the adapter to which this invention relates.

Figure 2 is a top plan view of said lift mechanism.

Figure 3 is an end view of said adapter, as viewed from the rightward end of Figure 1.

Figure 4 is a side view of said adapter with a differential supported thereon.

Figure 5 is a top view of said adapter, with said differential supported thereon.

Figure 6 is a left end view of said adapter, with said differential supported thereon.

*General description*

Figure 7:
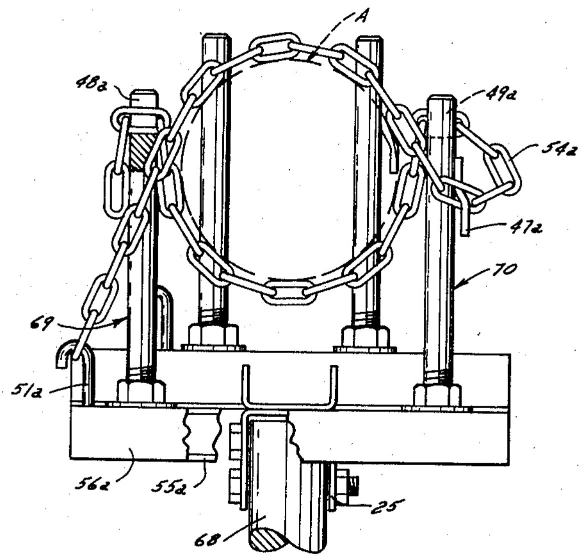
Figure 7 is an end view of a modified form of said adapter and support device therefor.

In carrying out the objects set forth above, the present invention contemplates, among other things, an adapter having a flexible element, such as a chain, for both supporting the automotive component being handled and firmly holding it with respect to the base of the adapter. By providing suitable anchoring means for the chain on said adapter base, and then utilizing the chain itself as the principal engaging member for the component being handled, this invention makes possible the handling of practically any size or shape of device normally encountered in the general field of use contemplated.

For the purpose of convenience in description, the terms "upper," "lower," "left," "right," "front" and "rear," and derivatives thereof, as used herein will have reference to the lift mechanism and parts thereof as appearing in Figure 1; and the terms "inner," "outer," and derivatives thereof, will have reference to the geometric center of the lift mechanism and parts thereof.

*Detailed construction*

As shown in Figures 1 and 2, the lift mechanism 10, in this illustration, is comprised of a hydraulically actuated lifting device 11 having a lift member, here an arm 12, upon the free end of which is mounted the adapter 13. The lifting device 11 may be of any convenient, conventional type having a carriage 14, which is mounted upon casters 15, and which has a pair of spaced, upright plates 16 and 17 mounted parallel with each other upon one end of the carriage 14. The lift arm 12 is comprised, in a substantially conventional manner, of a pair of parallel lift beams 18 and 19 which are pivotally and coaxially supported at adjacent ends of each upon, and between, the plates 16 and 17 by means of the inner pivot bolt 21.

The outer, free ends of said lift beams 18 and 19 pivotally support an outer pivot bolt 22, which extends through the flanges 23 and 24 of the U-shaped lift head 25. A pair of erecting bars 26 and 27 are pivotally secured at one end of each upon, and between, the plates 16 and 17, and are pivotally supported at their other ends upon, and between, the flanges 23 and 24, for the purpose of providing, with the lift beams 18 and 19, a pair of adjacent parallelograms in a substantially conventional manner. These parallelograms will cause the head 25 to remain in the same attitude, regardless of the elevation of the lift head with respect to the carriage 14. The lift arm 12 is raised and lowered in a conventional manner by a hydraulic cylinder 28, the cylinder of which is mounted upon the carriage 14 and the piston of which engages the lift beams 18 and 19 by means of the lift bolt 29 located near the plates 16 and 17.

The adapter 13 (Figures 2, 3, 4 and 6) has an H-shaped base frame 31, in this particular embodiment, the web 30 of which is secured, as by bolts or welding, upon the lift head 25. The web 30 of said base frame 31 is comprised of inner and outer channel members 32 and 33, the inner one of which is slidably disposed within the other, and contains a plurality of aligned openings 34 in the flanges thereof. The outer channel member 33 contains one pair of openings 35 in its flanges, through which an adjustment rod 36 may be extended and simultaneously received through a pair of said aligned openings 34 in the inner channel member 32. The leftward end (Figure 2) of the inner channel 32 is secured, as by welding, to the bottom surface of the web of a transversely positioned channel member 37 (Figure 2) intermediate the ends thereof. Another transversely positioned channel member 38, which opens toward the channel member 37, is supported upon said channel member 37 by means of a pair of end blocks 39, which are disposed between the adjacent ends of said channel members 37 and 38 and are held in such position by the bolts 41. Intermediate blocks 40 (Figure 2) may be secured between said channel members 37 and 38.

The facing channel members 37 and 38 provide a semi-enclosed zone in which a pair of mounting blocks, such as that shown at 42 in Figure 6, may be disposed for slidable movement lengthwise of said channel members 37 and 38. Each of said blocks 42 has a threaded, vertical opening 43 therethrough for threadedly engaging the lower threaded ends, respectively, of a pair of mounting posts 44 and 45. The mounting posts are held in position with respect to the channel members 37 and 38 and the mounting blocks 42 by means of lock nuts 46, which clamp down upon the channel members 37 and 38. The upper ends of said posts 44 and 45 are provided with aligned slots 48 and 49. A downwardly opening anchor hook 47 is secured, as by welding, to the outer surface of the post 44 near the upper end thereof. An adjustable hook 51 has a threaded shank 52, which is disposed between the channel members 37 and 38 outwardly of the mounting post 45 and is held against upward movement with respect to said channel members by the nut 53.

An elongated, flexible element, such as a length of chain 54, is engagable with the hooks 47 and 51, and its links are slidably received, edgewise, into the slots 48 and 49. When a particular length of chain 54 is disposed within one of said slots 48 and 49, the links adjacent to said particular link positively prevent movement of the chain with respect to the post in a direction radially thereof.

That end of the outer channel member 33 remote from the channel members 37 and 38 is secured, as by brazing or bolting, to the upper flanges of a pair of sidewardly and opposedly opening channel members 55 and 56, which may be substantially identical in shape, size and arrangement with the channel members 37 and 38. Said channel members 55 and 56 are also held with respect to each other by means of end blocks 57 and the bolts 58. As in the case of the channel members 37 and 38, additional interconnecting means may be provided between the channel members 55 and 56 intermediate the ends thereof, if desired or required. Mounting blocks 59 (Figure 3), which may be substantially identical to the mounting blocks 42, are disposed between the channel members 55 and 56 and contain vertical, threaded openings 61.

A plurality, here two, of object-positioning brackets 62 and 63, having threaded shanks 64 and 65, respectively, are threadedly received into the openings 61 in the blocks 59, and are locked into position with respect thereto by the lock nuts 66. Object-engaging pads 67 are mounted upon the upper ends of the shanks 64 and 65 and are specially contoured for the purpose of effecting engagement with a portion of the automotive component "A," which is supported upon the adapter 13. In this particular instance, the pads 67 are portions of angle iron which open upwardly.

*Operation*

As will be evident from the above, detailed description of the construction of the lift mechanism 10, the base frame 31 of the adapter 13 may be mounted upon the lift head 25 of any conventional lifting device 11, such as that disclosed in some detail hereinabove. The mounting posts 44 and 45 and the positioning brackets 62 and 63 may be moved lengthwise of their respective channel members 37 and 38, and 55 and 56, as desired or required. After said posts and brackets are adjusted for engaging the automotive component "A" (Figures 4, 5 and 6), at some convenient location intermediate its ends, said posts and brackets are then locked into position by means of the lock nuts 46 and 66. A plurality of brackets 62 and 63, having different types of pads, may be provided to engage various types of contours. However, under normal circumstances, the V-shaped pads 67 will be suitable for general purpose usage of the adapter 13.

Another portion of the component "A" extends between the mounting posts 44 and 45, where it rests upon one portion of the chain 54, which extends between said posts and is prevented from moving downwardly by having links thereof disposed within the slots 48 and 49. Said slots are of such width that they will receive a link of the chain in an edgewise position only. Either another portion of the same chain 54 or, alternatively, a separate chain, is hooked under the anchor hook 47 on the post 44, extends over the top of the component "A," and is connected to the adjustable hook 51. The hook 51 is then drawn downwardly by tightening the nut 53 on the shank 52 against the channel members 37 and 38. Thus, the portion of the chain under, and supporting, the component is prevented from moving downwardly by the slots in the upper ends of the mounting posts 44 and 45, while at the same time another portion of said chain is pulled downwardly by the hooks 47 and 51 against the component "A" to hold it in a relatively fixed position with respect to the base frame 31 of the adapter 13. The component "A" can now be disengaged from its mounting on an automobile, or placed into position with respect to said automobile, as the case may be.

The component "A" may be easily and quickly disengaged from the adapter 13 by loosening the nut 53 until the chain 54 can be disengaged from the hook 51. The relative distance between the frame 31 and the slots 48 and 49, or between the frame 31 and pads 67, may be varied, as desired or required, by loosening the lock nuts 46 and 66, respectively, and rotating the mounting posts or mounting brackets until the proper distance is obtained. The lock nuts 46 and 66 are then returned to their locking position and the adapter 13 is again in condition for operation. The distance between the channels 37 and 38 and the channels 55 and 56 may be varied by removing the rod 36 from the web 30, sliding the inner channel 32 along the outer channel 33 and then inserting said rod 36 through the openings 35 and a different pair of openings 34. Thus, it will be seen that the adapter 13 has flexibility in a variety of horizontal and vertical directions and can be easily adjusted for adaptation to automotive components of a variety of sizes and shapes by any person capable of removing or replacing the component being handled by the lift mechanism.

*Alternate structure*

It will be recognized that the adapter 13 is not limited to use with any particular type of lifting device, such as the hydraulically operated device disclosed herein for illustrative purposes. For example, the lift head 25 could be rigidly secured to the upper end of a post 68 (Figure 7). Such post could be stationary or it could be actuated in a conventional manner, by means not shown, to move the adapter upwardly, downwardly or laterally.

The positioning brackets 62 and 63, shown in Figure 3, may be replaced by positioning posts 69 and 70, as shown in Figure 7, which may be substantially identical to the mounting posts 44 and 45 of Figure 3. These positioning posts are provided with slots 48*a* and 49*a* in their upper ends and the post 70 supports an anchor hook 47*a*. An adjustable hook 51*a* is mounted upon the channel members 55*a* and 56*a*. Thus, an article "A" can be supported, at least in part, upon the posts 69 and 70 by means of a flexible element, such as the chain 54*a*, which is engaged by the slots 48*a* and 49*a* and the hooks 47*a* and 51*a* in substantially the same manner as set forth with respect to the posts 44 and 45. As above described in connection with Figures 1 to 6, the lower portion of the chain supports the article "A" while the upper part (or a separate chain) holds it firmly in place against the lower part.

Although a particular, preferred embodiment of our invention has been disclosed in detail hereinabove for illustrative purposes, it will be understood that variations or modifications thereof, which lie within the scope of such invention, are fully contemplated unless specifically stated to the contrary in the appended claims.

We claim:

1. An adapter for supporting a variety of objects upon the lift arm of a jack, including: a rigid base frame secured to said lift arm; a pair of laterally spaced positioning brackets secured to, and extending upwardly from, said base frame at one longitudinal end thereof; a pair of laterally spaced mounting posts extending upwardly from said base frame adjacent to the other longitudinal end thereof; a length of chain, said chain having a downwardly arched portion between said posts and an upwardly arched portion between said posts, said upwardly and downwardly arched portions defining a loop between said posts for encircling an object and supporting such object therebetween, said posts being provided with means adjacent their upper ends releasably supporting and latching the ends of said downwardly arched portion of said chain therebetween against downward and sidewise movement, chain anchoring means rigidly secured to said adapter and fixed with respect to one of said posts and releasably anchoring one end of said upwardly arched portion of said chain against upward movement; and a chain gripping means on said frame adjacent the other post releasably engaging the other end of said upwardly arched portion of said chain for preventing upward movement thereof whereby the object is encircled by said chain and is releasably but firmly supported thereby between said posts.

2. The structure of claim 1 wherein said posts have aligned slots in their upper ends into each of which a respective link at either end of said downwardly arched portion of said chain is slidably received, edgewise, and held by the adjacent links against movement transversely of said posts, said gripping means includes a first downwardly extending hook adjustably mounted upon said frame adjacent to the one post, and said anchor means is a second downwardly extending hook secured to the other post.

3. The structure of claim 1 wherein said frame has an elongated, expansible center member and a pair of parallel cross-members secured intermediate their ends to said center member near the opposite ends thereof, and said brackets and posts are adjustably mounted, both vertically and horizontally, upon said cross-members, respectively, and arranged to form a rectangular pattern.

4. An adapter for supporting a variety of objects upon the lift arm of a jack, including: a rigid, substantially H-shaped frame, said frame including a center web comprising a pair of telescoping members and means for securing said members in fixed, adjustable relationship with respect to each other whereby the length of said center web may be adjusted, said frame having a pair of legs extending transverse to said center web at the respective ends thereof; a pair of laterally spaced mounting posts extending upwardly from one of the legs of said frame, said posts being adjustable along said one leg; a pair of laterally spaced mounting brackets extending upwardly from the other leg of said frame and being adjustable therealong; a length of chain, said chain having a downwardly arched portion between said posts and an upwardly arched portion between said posts, said upwardly and downwardly arched portions defining a loop between said posts for encircling an object and supporting such object therebetween; slots in the upper ends of said posts releasably supporting the respective ends of said downwardly arched portion of said chain against lateral and downward movement, so that said downwardly arched portion of said chain lies therebetween for supporting an object; a first downwardly extending hook on one of said posts and a second downwardly extending hook on said one leg adjacent the other post, said hooks engaging the respective ends of said upwardly arched portion of said chain and preventing upward movement of the ends thereof so that said upwardly arched portion of said chain is adapted to overlie the object and retain same in position whereby the object is encircled by said chain and is releasably but firmly supported thereby between said posts.

References Cited in the file of this patent

UNITED STATES PATENTS

| | | |
|---|---|---|
| 1,026,036 | Hewitt | May 14, 1912 |
| 1,463,882 | Fuller | Aug. 7, 1923 |
| 1,517,010 | Lee | Nov. 25, 1924 |
| 2,431,589 | Shuler | Nov. 25, 1947 |
| 2,523,734 | Stephenson et al. | Sept. 26, 1950 |
| 2,637,449 | Hamer | May 5, 1953 |
| 2,748,459 | Orr | June 5, 1956 |

FOREIGN PATENTS

| | | |
|---|---|---|
| 135,002 | Switzerland | Aug. 31, 1929 |
| 554,356 | Great Britain | June 30, 1943 |
| 570,530 | Great Britain | July 11, 1945 |
| 607,803 | Great Britain | Sept. 6, 1948 |